W. J. SHERRINGTON.
MUD GUARD.
APPLICATION FILED FEB. 28, 1916.
1,207,642.
Patented Dec. 5, 1916.
2 SHEETS—SHEET 1.
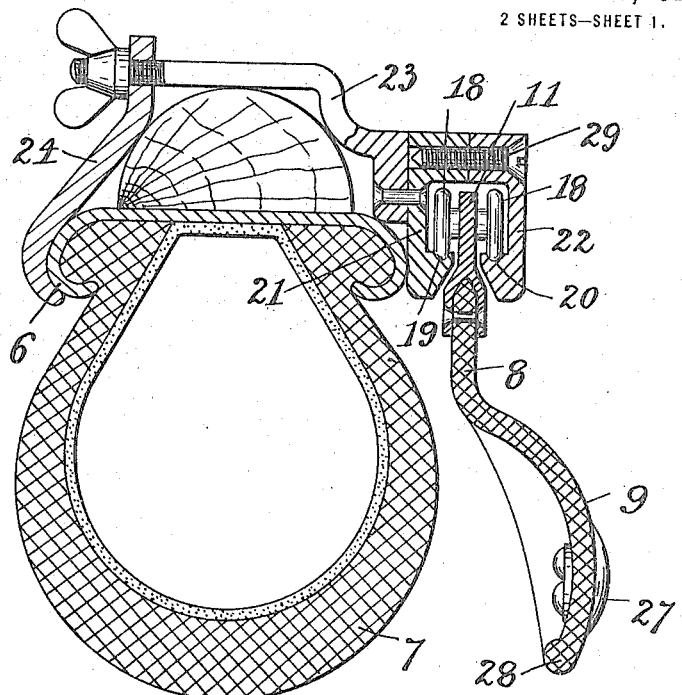
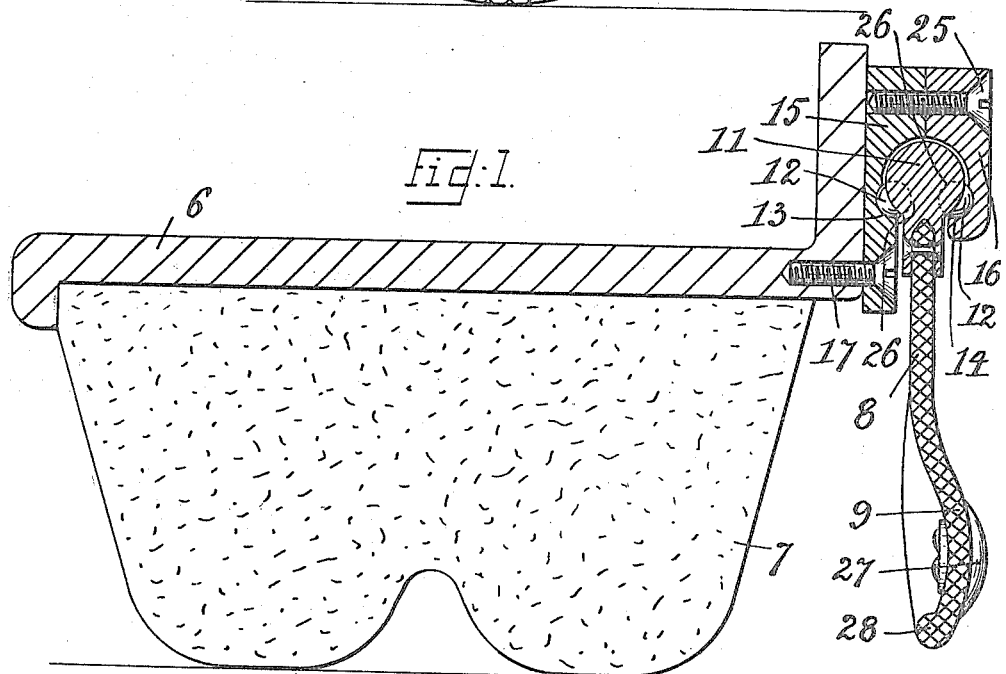
WITNESSES
H. C. Barry
H. E. Beck
INVENTOR
WILLIAM JOSEPH SHERRINGTON
BY Munn & Co.
ATTORNEYS W. J. SHERRINGTON.
MUD GUARD.
APPLICATION FILED FEB. 28, 1916.
1,207,642.
Patented Dec. 5, 1916.
2 SHEETS—SHEET 2.
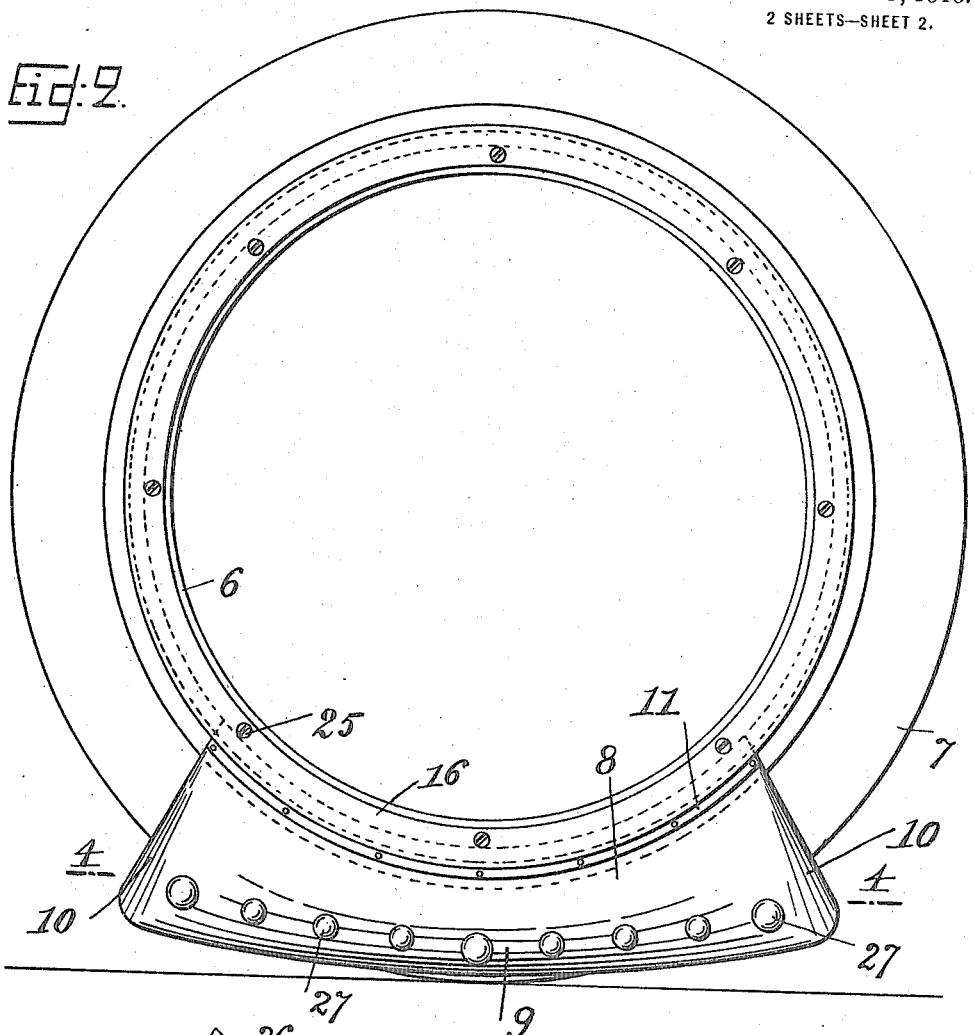
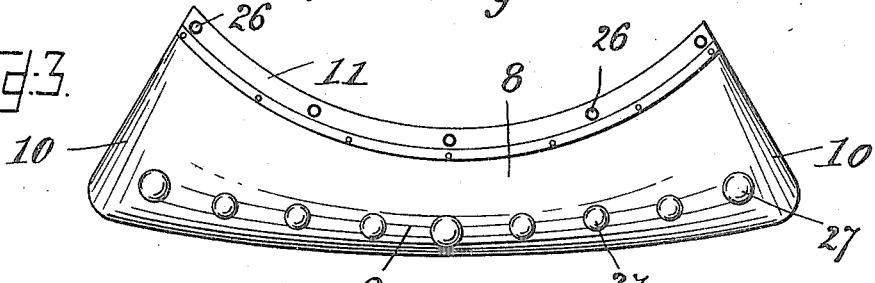
WITNESSES
F. E. Barry
H. E. Beck
INVENTOR
WILLIAM JOSEPH SHERRINGTON
BY
ATTORNEYS

UNITED STATES PATENT OFFICE.

WILLIAM JOSEPH SHERRINGTON, OF LONDON, ENGLAND.

MUD-GUARD.

1,207,642.  Specification of Letters Patent.  Patented Dec. 5, 1916.

Application filed February 28, 1916. Serial No. 81,014.

*To all whom it may concern:*

Be it known that I, WILLIAM JOSEPH SHERRINGTON, a subject of the King of Great Britain and Ireland, and a resident of London, England, have invented certain new and useful Improvements in Mud-Guards; and I do hereby declare the following to be a full, clear, and exact description of the same.

This invention relates to an improved anti-splash guard for motor car and other vehicle wheels.

According to the present invention, my improved device comprises a sectoral apron mounted on a sectoral carrier depending radially between two rings and supported by antifriction bearings resting in races in the rings on both sides, the rings being connected at their smallest peripheries and adapted to form a rigid structure with the wheel rim. By this construction the carrier is protected from damage and the easy running of the antifriction bearings is assured. In the operation of the device, the apron always occupies a position at the side of the lower sector of the tire and a short distance therefrom and above the ground level, and intercepts splashes raised by the tire and prevents them from being thrown laterally outward and causes them to fall onto the roadway in the proximity of the wheel.

The invention is illustrated in the accompanying drawings, in which:—

Figure 1 is a transverse section showing the device applied to the rim of a motor bus wheel; Fig. 2 is an elevation thereof on a smaller scale; Fig. 3 is an elevation, parts being removed to reveal details of construction; Fig. 4 is a sectional plan on 4—4, Fig. 2; Fig. 5 is a similar view to Fig. 1, showing the device applied to the rim of a motor car wheel.

In the drawings, the numeral, 6, indicates the rim of the wheel; 7 indicates the tire, and 8 indicates the flexible apron. The apron is preferably constructed of an oblong sectoral shape, dished, at 9, in vertical section (Figs. 1 and 5), and dished, at 10, at the fore and aft ends in sectional plan (Fig. 4). The apron is applied to the wheel rim by being held in a sectoral carrier, 11, which may be supported by antifriction balls, 12, held in cups, 26, and running on races, 13, 14, in rings, 15, 16, connected at their smallest peripheries and secured to the wheel rim by screws or the like, 25, 17, as shown in Figs. 1 and 2. Or, the carrier may be supported on antifriction rollers, wheels or the like, 18, running in races, 19, 20, in rings, 21, 22, connected at their smallest peripheries and secured to the wheel rim by screws, 29, and by clamps, 23, 24, or the like, as shown in Fig. 5. As the tire wears away in depth in use, the apron can be removed, shortened from the top edge, and replaced in position so as to retain the dished formation and beaded edges.

The apron may be made of rubber, rubbered canvas or the like flexible material, and may be furnished with studs, 27, to take the wear when contacting with the curb or the like, and may have its edges inturned and thickened or beaded, as at 28.

What I claim as my invention and desire to secure by Letters Patent is:—

1. An antisplash guard for a vehicle wheel comprising, in combination, two rings connected at their smaller peripheral parts and adapted to form a rigid structure with the wheel rim and spaced apart at their larger peripheral parts, races in the spaced parts of the rings, a sectoral carrier depending radially between the spaced parts of the rings and between the races on both sides, antifraction bearings resting in the races and supporting the carrier, and a sectoral apron depending from the carrier.

2. An antisplash guard for a vehicle wheel comprising, in combination, two rings connected at their smaller peripheral parts and adapted to form a rigid structure with the wheel rim and spaced apart at their larger peripheral parts, races in the spaced parts of the rings, a sectoral carrier depending radially between the spaced parts of the rings and between the races on both sides, antifriction bearings resting in the races and supporting the carrier, and a sectoral apron dished in sectional plan as well as in vertical section depending from the carrier.

3. An antisplash guard for a vehicle wheel comprising, in combination, two rings connected at their smaller peripheral parts and adapted to form a rigid structure with the wheel rim and spaced apart at their larger peripheral parts, races in the spaced parts of the rings, a sectoral carrier depending radially between the spaced parts of the rings and between the races on both sides, antifriction bearings resting in the races and supporting the carrier, and a flexible sectoral apron depending from the carrier, said apron being dished in sectional plan as well as in vertical section and having its edges inturned and beaded.

4. An antisplash guard for a vehicle wheel comprising, in combination, two rings connected at their smaller peripheral parts and adapted to form a rigid structure with the wheel rim and spaced apart at their larger peripheral parts, races in the spaced parts of the rings, a sectoral carrier depending radially between the spaced parts of the rings and between the races on both sides, antifriction bearings resting in the races and supporting the carrier, and a flexible sectoral apron depending from the carrier, said apron being dished in sectional plan as well as in vertical section and furnished with studs to take the wear when contacting with a curb or the like.

5. An antisplash guard for a vehicle wheel comprising, in combination, two rings connected at their smaller peripheral parts and adapted to form a rigid structure with the wheel rim and spaced apart and having inward projections at their larger peripheral parts, races in the inward projections, a sectoral carrier depending radially between the spaced parts of the rings and between the races on both sides, antifriction wheels resting in the races and supporting the carrier without contact with the connected smaller peripheral parts of the rings, and a sectoral apron depending from the carrier.

6. In combination, a vehicle wheel comprising a rim and a tire, and an antisplash guard comprising two rings connected at their smaller peripheral parts and spaced apart at their larger peripheral parts, means for rigidly securing the rings to the wheel rim, races in the spaced peripheral parts of the rings, a sectoral carrier depending radially between the spaced parts of the rings and between the races on both sides, antifriction bearings resting in the races and supporting the carrier, and a sectoral apron depending from the carrier at the side of the lower sector of the tire and at such a distance from the wheel axle that said apron will not come into contact with the ground.

In witness whereof I affix my signature.

WILLIAM JOSEPH SHERRINGTON.